United States Patent
Leppanen et al.

(10) Patent No.: US 11,805,312 B2
(45) Date of Patent: Oct. 31, 2023

(54) MULTI-MEDIA CONTENT MODIFICATION

(71) Applicant: Nokia Technologies Oy, Espoo (FI)

(72) Inventors: Jussi Artturi Leppanen, Tampere (FI); Lasse Juhani Laaksonen, Tampere (FI); Miikka Tapani Vilermo, Siuro (FI); Arto Juhani Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/799,310

(22) PCT Filed: Feb. 2, 2021

(86) PCT No.: PCT/EP2021/052382
§ 371 (c)(1),
(2) Date: Aug. 12, 2022

(87) PCT Pub. No.: WO2021/160465
PCT Pub. Date: Aug. 19, 2021

(65) Prior Publication Data
US 2023/0074589 A1 Mar. 9, 2023

(30) Foreign Application Priority Data
Feb. 14, 2020 (EP) .................... 20157385

(51) Int. Cl.
| H04N 23/60 | (2023.01) |
| H04N 23/61 | (2023.01) |
| H04N 23/63 | (2023.01) |
| H04N 5/262 | (2006.01) |
| H04S 7/00 | (2006.01) |

(52) U.S. Cl.
CPC ........... *H04N 23/64* (2023.01); *H04N 5/2628* (2013.01); *H04N 23/61* (2023.01); *H04N 23/632* (2023.01); *H04S 7/00* (2013.01)

(58) Field of Classification Search
CPC ...... H04N 23/64; H04N 5/2628; H04N 23/61; H04N 23/632; H04N 23/611; H04N 23/69; H04N 23/695; H04S 7/00; H04R 3/005
USPC ..................................................... 348/239
See application file for complete search history.

(56) References Cited

U.S. PATENT DOCUMENTS

| 2015/0146078 A1* | 5/2015 | Aarrestad | ............ | H04N 23/635 |
| | | | | 348/345 |
| 2017/0032555 A1* | 2/2017 | Gingawa | ............... | H04N 23/741 |
| 2018/0288307 A1* | 10/2018 | Allie | ...................... | H04N 23/67 |
| 2020/0296521 A1* | 9/2020 | Wexler | ................... | G06F 18/251 |
| 2021/0185468 A1* | 6/2021 | Roussel | ................. | H04S 7/303 |
| 2021/0350823 A1* | 11/2021 | Wexler | ................... | G10L 15/07 |
| 2022/0172736 A1* | 6/2022 | Wexler | ................... | G10L 17/02 |

FOREIGN PATENT DOCUMENTS

EP 3151534 A1 4/2017

* cited by examiner

*Primary Examiner* — Usman A Khan
(74) *Attorney, Agent, or Firm* — Harrington & Smith (57) ABSTRACT

An apparatus including means for: identifying audio-focus attenuation of a sound source; determining a correspondence between the sound source that is subject to audio focus attenuation and a corresponding visual object; and modifying capturing of an image to at least partially exclude and/or modify the visual object corresponding to the sound source subject to audio focus attenuation.

20 Claims, 4 Drawing Sheets

MULTI-MEDIA CONTENT MODIFICATION

CROSS REFERENCE TO RELATED APPLICATION

This patent application is a U.S. National Stage application of International Patent Application Number PCT/EP2021/052382 filed Feb. 2, 2021, which is hereby incorporated by reference in its entirety, and claims priority to EP 20157385.4 filed Feb. 14, 2020.

TECHNOLOGICAL FIELD

Embodiments of the present disclosure relate to multi-media content. In particular capturing and/or processing multi-media content.

BACKGROUND

Multi-media content is frequently recorded in ad-hoc, unplanned scenarios by non-professionals. For example, video with sound can be easily recorded on a portable camera, a camera-enabled mobile telephone, or a sports-activity camera.

It would be desirable to improve the quality of the multi-media content captured or recorded.

BRIEF SUMMARY

According to various, but not necessarily all, embodiments there is provided an apparatus comprising means for:
identifying audio-focus attenuation of a sound source;
determining a correspondence between the sound source that is subject to audio-focus attenuation and a corresponding visual object; and
modify capturing of an image to at least partially exclude and/or modify the visual object corresponding to the sound source that is subject to audio focus attenuation.

In some, but not necessarily all, examples the apparatus comprises means for:
determining a location of the sound source that is subject to audio focus attenuation;
determining a visual object, associated with the location of the sound source that is subject to audio focus attenuation; and
modifying the captured image to exclude the determined visual object.

In some, but not necessarily all, examples the means for determining a location of the sound source that is subject to audio focus attenuation comprises means for:
determining that a candidate sound source has an energy or level in excess of a threshold;
determining an absence of sufficient correlation between a targeted sound source and the candidate sound source; and
if the candidate sound source has an energy or level in excess of the threshold and has an absence of sufficient correlation with the targeted sound source, obtaining a location of the candidate sound source.

A targeted sound source can instead be a user-selected sound source.

Targeting can for example occur via user-selection. In some, but not necessarily all, examples the targeted sound source is user-selected, the apparatus comprises means for user-selection, in a viewfinder display, of a visual object associated with the targeted sound source.

In some, but not necessarily all, examples the candidate sound source can be located at any one of a plurality of locations, for example discrete locations.

In some, but not necessarily all, examples the candidate sound source can be located using spatial audio.

In some, but not necessarily all, examples the means for determining a visual object, associated with the location of the sound source that is subject to audio focus attenuation comprises means for object recognition.

In some, but not necessarily all, examples the means for modifying capturing of an image is configured to re-frame a captured image to exclude the visual object associated with the sound source.

In some, but not necessarily all, examples the means for modifying capturing of an image is configured to change a crop applied to an image detected at an image sensor array, wherein the applied crop determines the image captured.

In some, but not necessarily all, examples the means for modifying capturing of an image is configured to change a position of the crop applied to the image detected at the image sensor array.

In some, but not necessarily all, examples the means for modifying capturing of an image is configured to maintain a size of the crop applied to the image detected at the image sensor array.

In some, but not necessarily all, examples the means for modifying capturing of an image is configured to exclude all visual objects associated with sound sources subject to audio focus attenuation.

In some, but not necessarily all, examples the means for modifying capturing of an image is configured to exclude selected visual objects associated with sound sources subject to audio focus attenuation, wherein the selection of the visual objects is dependent upon one or more of:
minimizing a number of visual objects associated with sound sources subject to audio focus attenuation, within the captured image;
maximizing a number of visual objects associated with sound sources subject to audio focus attenuation, excluded from the captured image;
minimizing a total energy of sound sources subject to audio focus attenuation and associated with visual objects within the captured image;
maximizing a total energy of sound sources subject to audio focus attenuation and associated with visual objects excluded from the captured image;
object recognition of visual objects associated with sound sources subject to audio focus attenuation;
proximity to the apparatus of visual objects associated with sound sources subject to audio focus attenuation; and
minimizing an area of the captured image occupied by visual objects associated with sound sources subject to audio focus attenuation.

According to various, but not necessarily all, embodiments there is provided a computer program that, when run on a computer, performs:
identifying audio focus attenuation of a sound source;
determining a correspondence between the sound source that is subject to audio focus attenuation and a corresponding visual object; and
modifying capturing of an image to at least partially exclude and/or modify the visual object corresponding to the sound source subject to audio focus attenuation.

According to various, but not necessarily all, embodiments there is provided a method comprising:
identifying audio focus attenuation of a sound source;
determining a correspondence between the sound source that is subject to audio focus attenuation and a corresponding visual object; and
modifying capturing of an image to at least partially exclude and/or modify the visual object corresponding to the sound source subject to audio focus attenuation.

According to various, but not necessarily all, embodiments there is provided examples as claimed in the appended claims.

Definitions

Audio-focus attenuation of a sound source is the application of relative attenuation to that sound source. The level of the sound source is reduced.

Audio-focus attenuation of a sound source is the application of relative gain to that sound source. The level of the sound source is increased.

Audio-focus attenuation of one (or more) of multiple sound sources necessarily results in audio-focus gain of the other ones of the multiple sound sources, Audio-focus gain of one (or more) of multiple sound sources necessarily results in audio-focus attenuation of the other ones of the multiple sound sources,

BRIEF DESCRIPTION

Some example embodiments will now be described with reference to the accompanying drawings in which.

DETAILED DESCRIPTION

Figure 1A:
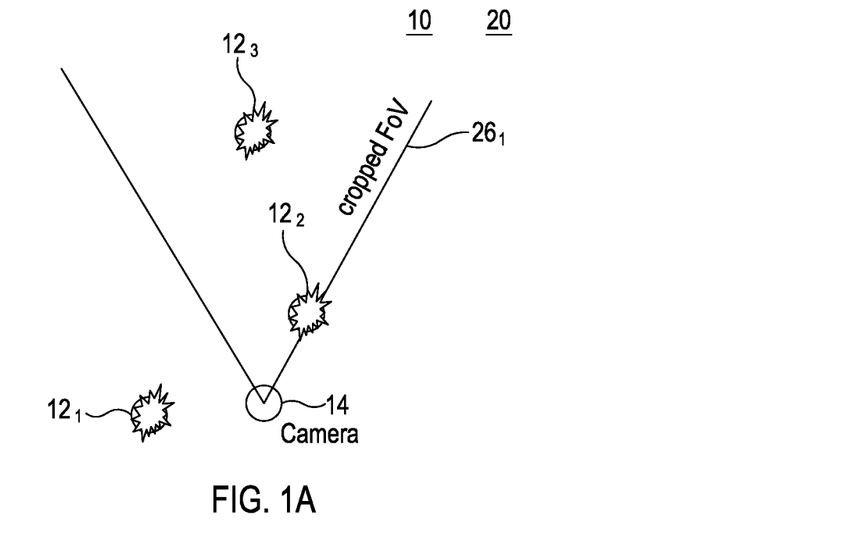
FIGS. 1A & 1B shows an example embodiment of the subject matter described herein.
Figure 1B:
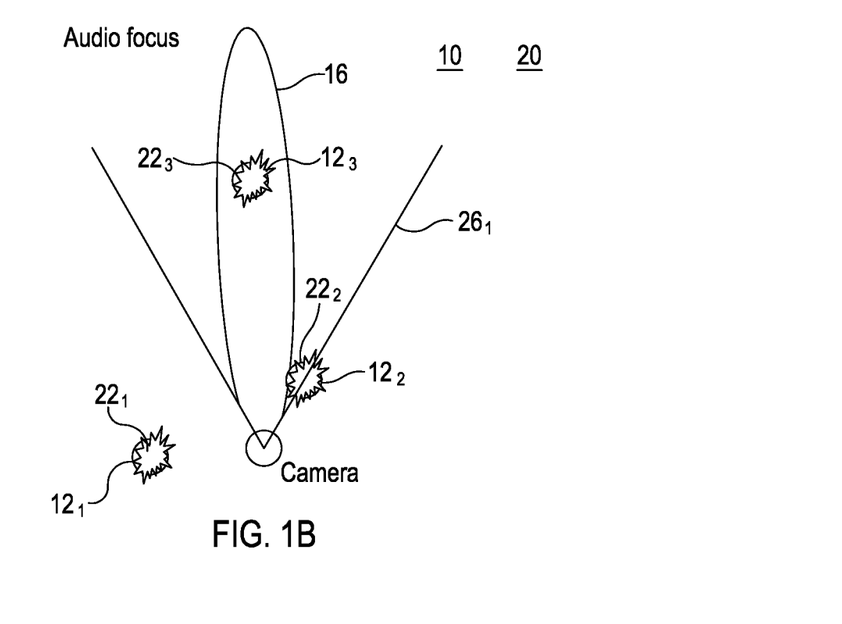

FIGS. 1A and 1B illustrate an example of a sound space 10 comprising multiple sound sources 12. The sound sources 12 that are at different positions are labelled with a different sub-script. The FIG. 1A and FIG. 1B illustrate three sound sources $12_1$, $12_2$, $12_3$ that are a different positions relative to an origin 14.

Audio capture devices, such as microphones, can be placed at or near the origin 14. The audio capture devices can for example be arranged as an array, for example, a one, two or three dimensional array.

The use of multiple audio capture devices enables selective relative attenuation of one sound source 12 relative to another sound source 12.

In this example, there are multiple sound sources 12 including at least a targeted sound source $12_3$ and one or more other, untargeted, sound sources $12_1$, $12_2$.

An audio capture apparatus is configured to apply relative gain to the targeted sound source $12_3$ and relative attenuation to the one or more other, untargeted sound sources $12_1$, $12_2$ to create an audio focus 16 for the targeted sound source $12_3$. There is audio-focus attenuation of the one or more untargeted sound sources $12_2$, $12_2$.

The targeted sound source $12_3$ is at a first position relative to the origin 14 and the one or more untargeted sound sources $12_1$, $12_2$ are at second positions from the origin 14, different to the first position. That is the targeted sound source $12_3$ is spatially distinct from the one or more untargeted sound sources $12_1$, $12_2$.

The audio capture apparatus can be configured to use beamforming to isolate sound coming from the first position. Beamforming uses a weighted linear combination of audio signals from the different audio capture devices. The weighted linear combination of audio signals can be performed in hardware or in software or in a combination of hardware and software.

In some but not necessarily all examples, the weightings for the linear combination are adaptive. They can, for example, be obtained in some examples by minimizing an energy of interfering sound sources (e.g. untargeted sound sources $12_1$, $12_2$) under a constraint to keep the response in a target direction towards the first position. This is a minimum variance distortionless response.

In some but not necessarily all examples, the weightings are frequency dependent. For example, a beamformer can be used to process signals from an array of discrete microphones and provide spatial filtering of propagating sound fields. The spatial filtering separates signals that have overlapping frequency content but originate from different spatial locations. A target signal from a target position (bearing) is not attenuated but signals from other locations (bearings) are attenuated. The spatial filter creates deep nulls in gain for directions of untargeted signals. The beamformer can therefore operate as a spatial bandpass filter for signals from a targeted direction 16 and as a bandstop filter for signals from an untargeted direction.

The weighted linear combination of the audio signals from the different microphones can be represented as $y(t)=w^H x(t)$. For a complex plane wave with direction of arrival $\theta$, $y(t)=\exp(j\omega t) \cdot r(\theta, \omega)$ where the beam former response $r(\theta, \omega)=w^H d(\theta, \omega)$; $d(\theta, \omega)$ is the steering vector.

$w^H$ is selected so that y(t) contains a significantly greater (e.g. maximal) contribution from a targeted sound source $12_3$ (audio focus 16 in targeted direction) and a significantly lesser (e.g. minimal) contribution from untargeted sound sources $12_1$, $12_2$ (untargeted directions). It can be applied across a single frequency band or separately across distinct frequency bands.

The weights $w^H$ can be obtained by minimizing a cost function. e.g. minimize output variance (from what is targeted) subject to a response constraint such as a targeted gain for one direction and a targeted attenuation (e.g. force zero gain) for another direction. This creates a minimum variance distortionless response (MVDR) beamformer that preserves the targeted signal (e.g. from the target sound source $12_3$) while minimizing contributions to the output from untargeted signals from untargeted directions (e.g. from the untargeted sound sources $12_1$, $12_2$).

The weightings and spatial filtering can change in real-time. For example, the steering vector $d(\theta, \omega)$ can change in real-time. For example, the weights $w^H$, can be adapted in real-time.

FIGS. 1A and 1B also illustrate an example of a visual space 20 comprising one or more visual objects 22. The visual objects 22 that are at different positions are labelled with a different subscript. FIGS. 1A and 1B illustrate three visual objects $22_1$, $22_2$, $22_3$ that are at different positions relative an origin 14.

In this example, but not necessarily all examples each sound source $12_1$, $12_2$, $12_3$ has a corresponding visual object $22_1$, $22_2$, $22_3$.

In this example, the sound space 10 and the visual space 20 correspond. The positions of the sound sources $12_1$, $12_2$, $12_3$ in the sound space 10 overlap the positions of the visual objects $22_1$, $22_2$, $22_3$ in the visual space 20.

One or more image capture devices, such as a camera, can be placed at or near the origin 14. The image capture devices can for example be arranged to capture a visual scene defines by a field of view $26_1$. The image capture device can for example be a video camera that captures video comprising a sequence of visual scene defined by the field of view $26_1$.

In this example, the visual objects $22_1$, $22_2$ correspond to attenuated sound sources $12_1$, $12_2$ and the visual object $22_3$ corresponds to a non-attenuated sound source $12_3$. An attenuated sound source can, for example, be a silenced sound source.

It can be seen from FIG. 1B that the visual object $22_1$ corresponding to the attenuated sound source $12_1$ is not within the field of view $26_1$ and is not therefore within the visual scene captured by the camera at the origin 14.

It can be seen from FIG. 1B that the visual object $22_3$ corresponding to the non-attenuated sound source $12_3$ is within the field of view $26_1$ and is therefore within the visual scene captured by the camera at the origin 14.

It can be seen from FIG. 1B that the visual object $22_2$ corresponding to the attenuated sound source $12_2$ is within the field of view $26_1$ and is therefore within the visual scene captured by the camera at the origin 14.

In this example, the visual object $22_2$ corresponding to the attenuated sound source $12_2$ that is within the field of view $26_1$ can be a distraction from the visual object $22_3$ corresponding to the non-attenuated sound source $12_3$. This is particularly so, when the visual object $22_2$ corresponding to the attenuated sound source $12_2$, which is within the field of view $26_1$ occupies a greater portion of the visual scene than the visual object $22_3$, or the visual object $22_2$ is a foreground object when the visual object $22_3$ is a background object; or the visual object $22_2$ is a dynamic visual object (a visual object that moves position and/or changes).

Figure 2A:
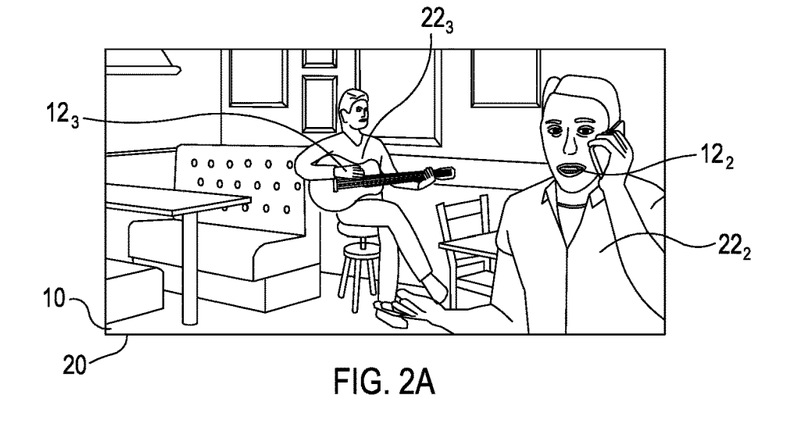
FIG. 2A shows another example embodiment of the subject matter described herein.

FIG. 2A illustrates an example of a visual scene. A visual object $22_2$ corresponds to an attenuated sound source $12_2$. The position of the visual object $22_2$ and its corresponding attenuated sound source $12_2$ is within the field of view $26_1$. The visual object $22_2$ can be seen in the captured image. A visual object $22_3$ corresponds to a non-attenuated sound source $12_3$. The position of the visual object $22_3$ and its corresponding non-attenuated sound source $12_3$ is within the field of view $26_1$. The visual object $22_3$ can be seen in the captured image. The captured audio from the non-attenuated sound source $12_3$ is most prominent aurally whereas the larger size, foreground visual object $22_2$ is most prominent visually. The larger size, foreground visual object $22_2$ distracts visually from the visual object $22_3$ that corresponds to the non-attenuated sound source $12_3$.

The following method 100 (FIG. 3) reduces the distraction.

Figure 3:
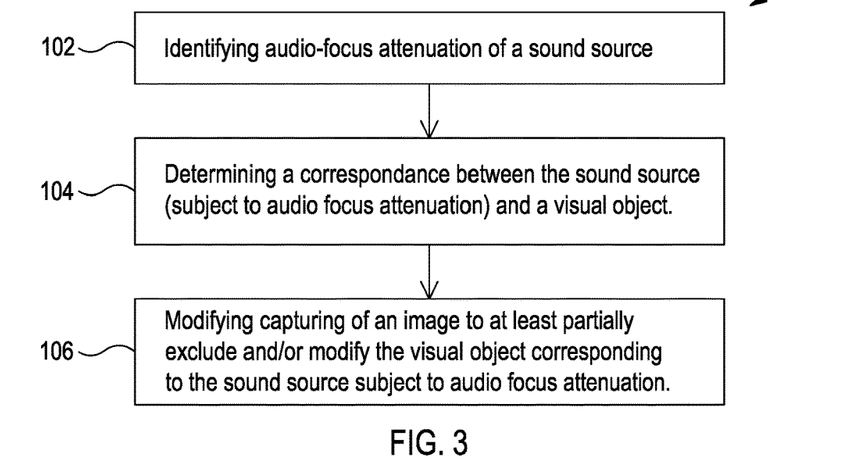
FIG. 3 shows another example embodiment of the subject matter described herein.

The method 100 comprises:

at block 102, identifying audio-focus attenuation of a sound source $12_2$;

at block 104, determining a correspondence between the sound source $12_2$ that is subject to audio focus attenuation and a corresponding visual object $22_2$; and at block 106, modifying capturing of an image to at least partially exclude and/or modify the visual object $22_2$ corresponding to the sound source $12_2$ subject to audio focus attenuation.

In some but not necessarily all examples, at block 102, the method can comprise automatically identifying audio-focus attenuation of a sound source $12_2$. In some but not necessarily all examples, at block 104, the method can comprise automatically determining a correspondence between the sound source $12_2$ that is subject to audio focus attenuation and a corresponding visual object $22_2$. In some but not necessarily all examples, at block 106, the method can comprise automatically modifying capturing of an image to at least partially exclude and/or modify the visual object $22_2$ corresponding to the sound source $12_2$ subject to audio focus attenuation.

The method reduces a visual impact on the captured image of the visual object $22_2$ corresponding to the sound source $12_2$ subject to audio focus attenuation.

Figure 2B:
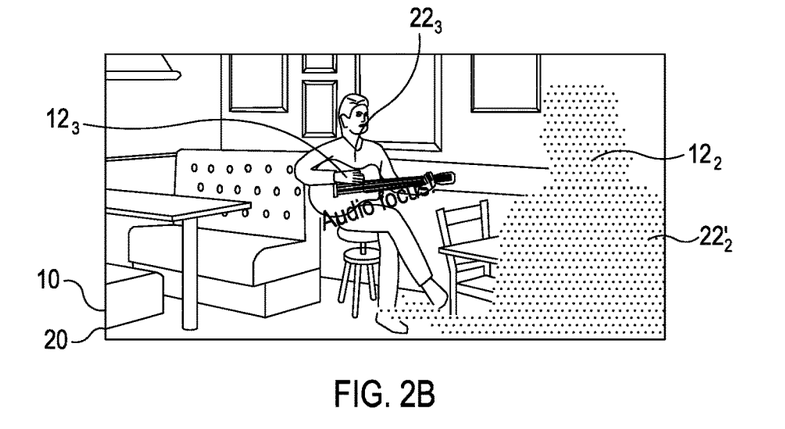
FIG. 2B shows another example embodiment of the subject matter described herein.

An example of an outcome of the method 100 is illustrated in FIG. 2B. The method modifies capturing of an image to at least partially modify the visual object $22_2$ corresponding to the sound source $12_2$ subject to audio focus attenuation. The unmodified visual object $22_2$ is shown in FIG. 2A and the modified visual object $22_2'$ is shown in FIG. 2B. In this example, the unmodified visual object $22_2$ (not the visual object $22_3$) is subject to a blurring kernel, for example of 50 pixels, to produce the modified visual object $22_2$. In effect the visual object $22_2$ corresponding to the sound source $12_2$ subject to audio focus attenuation, is visually attenuated, for example by blurring, colouring etc.

Figure 2C:
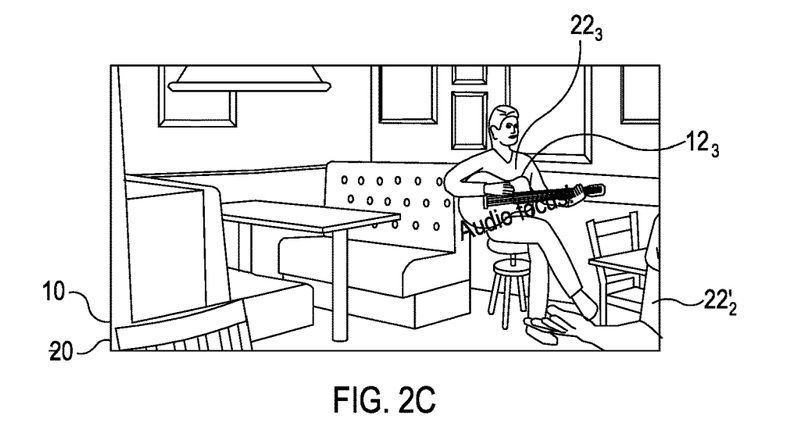
FIG. 2C shows another example embodiment of the subject matter described herein.

An example of an outcome of the method 100 is illustrated in FIG. 2C. The method modifies capturing of an image to reframe the visual scene and at least partially exclude the visual object $22_2$ corresponding to the sound source $12_2$ subject to audio focus attenuation. The unmodified visual object $22_2$ is shown in FIG. 2A and the at least partially excluded modified visual object $22_2'$ is shown in FIG. 2C. In this example, the unmodified visual object $22_2$ (not the visual object $22_3$) is subject to at least partial excluding from the captured image. This can, for example, be achieved by effectively re-framing the image that is captured by panning or tracking and/or zooming. This can be achieved by changing the size and/or direction of the field of view 26.

Figure 4A:
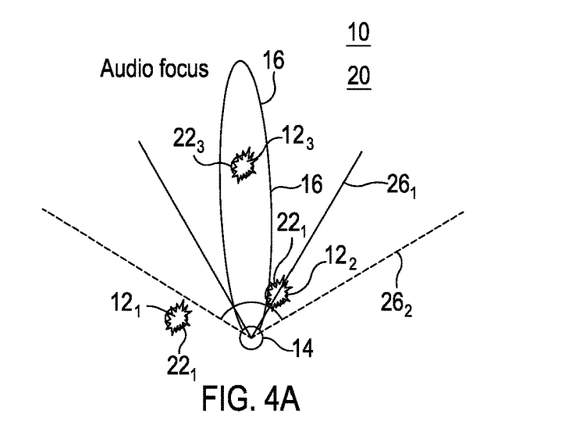
FIGS. 4A & 4B shows another example embodiment of the subject matter described herein.

FIG. 4A is similar to FIG. 1B. It illustrates that the visual object $22_3$ corresponding to the non-attenuated sound source $12_3$ is within the field of view $26_1$ and is therefore within the visual scene captured by the camera at the origin 14 and that the visual object $22_2$ corresponding to the attenuated sound source $12_2$ is within the field of view $26_1$ and is therefore within the visual scene captured by the camera at the origin 14.

Figure 4B:
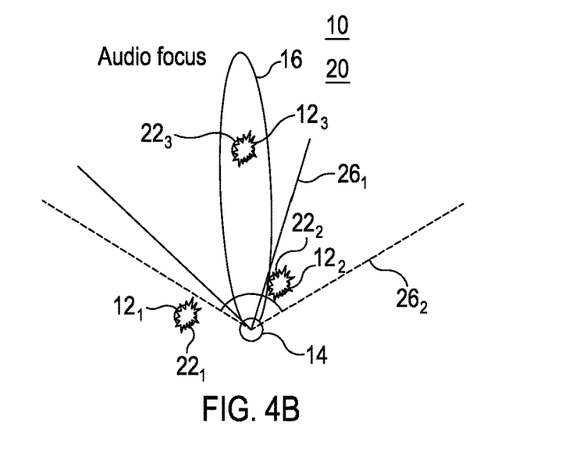

FIG. 4B, is similar to FIG. 1B, however, the field of view $26_1$ has been modified to a new field of view the field of view $26_1'$ This reframes the captured image excluding all or part of the visual object $22_2$ corresponding to the attenuated sound source $12_2$ Therefore FIG. 4B illustrates that the visual object $22_3$ corresponding to the non-attenuated sound source $12_3$ is within the new field of view $26_1'$ and is therefore within the visual scene captured by the camera at the origin 14 and that the visual object $22_2$ corresponding to the attenuated sound source $12_2$ is at least partially excluded from the new field of view $26_1'$ and is therefore no longer within the visual scene captured by the camera at the origin 14.

In some examples, the re-framing occurs automatically. In other examples, the user is given a user-selectable option to cause the re-framing.

In this example the re-framing maintains the same resolution and is effectively a pan or track. In other examples, the re-framing additionally or alternatively changes the resolution and is effectively a zoom.

Figure 5A:
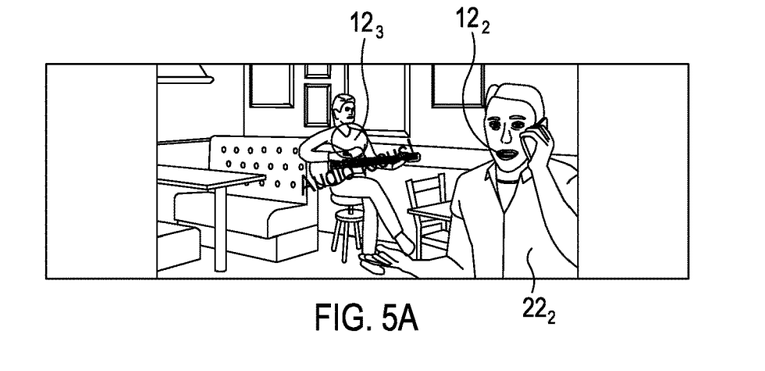
FIGS. 5A & 5B shows another example embodiment of the subject matter described herein.
Figure 5B:
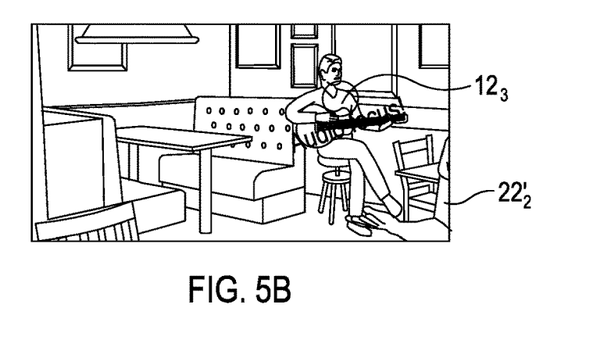

In the examples of FIGS. 4A and 4B a second larger field of view $26_2$ is illustrated. The large field of view $26_2$ illustrates the visual scene imaged by an image sensor of the camera. The smaller field of view $26_1$, $26_1'$ illustrates the visual scene captured by the image sensor. The smaller field of view $26_1$, $26_1'$ is a sub-portion of the second larger field of view $26_2$. The framing illustrated in FIG. 4B is achieved by cropping the large field of view image to achieve a smaller field of view image. The crop can change in size and/or position between FIGS. 4A and 4B. The crop can stay the same size between FIGS. 4A and 4B. In this example, modifying capturing of an image is configured to change a crop applied to an image detected at an image sensor array, wherein the applied crop determines the image captured. The crop defines a contiguous sub-set of the sensels of the sensor array. The position of the crop applied to the image detected at the image sensor array is changed. The size of the crop applied to the image detected at the image sensor array can be maintained or changed. The effect of re-cropping is illustrated in FIGS. 5A and 5B. FIG. 5A illustrates an image detected at an image sensor array (field of view $26_2$) and the currently applied crop (field of view $26_1$ which includes the visual object $22_2$ corresponding to the attenuated sound source $12_2$). FIG. 5B illustrates a captured image that is defined by a new crop (field of view $26_1'$ which does not includes the visual object $22_2$ corresponding to the attenuated sound source $12_2$) newly applied to the image detected at an image sensor array (field of view $26_2$). In this example, but not necessarily all examples, the captured image retains a portion (the modified visual object $22_2'$) of the excluded visual object $22_2$ corresponding to the attenuated sound source $12_2$.

The method 100 (FIG. 3) comprises at block 102, identifying audio-focus attenuation of a sound source $12_2$. This block can, for example, comprise:
obtaining an audio focus direction e.g. the beamforming steering vector $d(\theta, \omega)$;
obtaining sound source directions;
determining one or more sound sources that are attenuated e.g. not in the audio focus direction.

The method 100 comprises, at block 104, determining a correspondence between the sound source 12 that is subject to audio focus attenuation and a corresponding visual object 22.

This block 104 can comprise:
determining a location of the sound source 12 that is subject to audio focus attenuation; determining a visual object 22, associated with the location of the sound source 12 that is subject to audio focus attenuation; and
modifying the captured image to exclude or modify the determined visual object 22.

A visual object 22 is associated with the location of the sound source 12 that is subject to audio focus attenuation if it is at or near that location, for example, if the visual object 22 (or any part of the visual object 22) is within a threshold distance of that location.

In some but not necessarily all examples, before block 104, an image is captured. This captured image is then modified at block 106. In some but not necessarily all examples, the captured image is processed to identify the corresponding visual object $22_2$.

Computer vision techniques can be used to identify a perimeter of a visual object 22 associated with a location or otherwise recognise or characterise the visual object 22 associated with the location. The computer vision techniques can for example include edge or corner detection, interest point detection and feature detection.

A location can, for example be a one-dimensional bearing (e.g. azimuthal angle $\phi$)), a two-dimensional bearing (e.g. azimuthal angle $\phi$ and polar angle $\theta$), a two-dimensional coordinate (e.g. Cartesian (x, y) or polar (r, $\phi$)) or a three-dimensional co-ordinate (e.g. Cartesian (x, y, z) or cylindrical polar (r, $\phi$, z) or spherical polar (r, $\phi$, $\theta$)).

Modifying the captured image to modify the determined visual object 22 can, for example, comprise processing a captured image, for example as described with reference to FIG. 2B.

Modifying the captured image to modify the determined visual object 22 can, for example, comprise re-framing or cropping a captured image, for example as described with reference to FIG. 2C or FIG. 4A, 4B, 5A, 5B.

A candidate sound source (which may or may not be a sound source 12 that is subject to audio focus attenuation) can be identified as a sound source 12 that is subject to audio focus attenuation as a consequence of the candidate sound source 12 having an energy or level in excess of a threshold and an absence of sufficient correlation (a correlation score below a threshold) between a targeted sound source $12_3$ and the candidate sound source 12.

Determining a location of the sound source 12 that is subject to audio focus attenuation can comprise:
determining that a candidate sound source 12 has an energy or level in excess of a threshold;
determining an absence of sufficient correlation between a targeted sound source $12_3$ and the candidate sound source 12; and
if the candidate sound source 12 has an energy or level in excess of the threshold and has an absence of sufficient correlation with the targeted sound source $12_3$, obtaining a location of the candidate sound source 12.

The threshold can be zero or can be a non-zero threshold.

The candidate sound source 12 can, in some examples, be located at any one of a plurality of discrete locations, for example, defined by quantised values of the beamforming steering vector $d(\theta, \omega)$.

The candidate sound source 12 can be located using spatial audio, for example, using a beamformer as described above; or from metadata associated with the candidate sound object.

The targeted sound source $12_3$ can, in some but not necessarily all examples, be user-selected. The apparatus can for example comprises means for user-selection, in a viewfinder display.

Figure 6A:
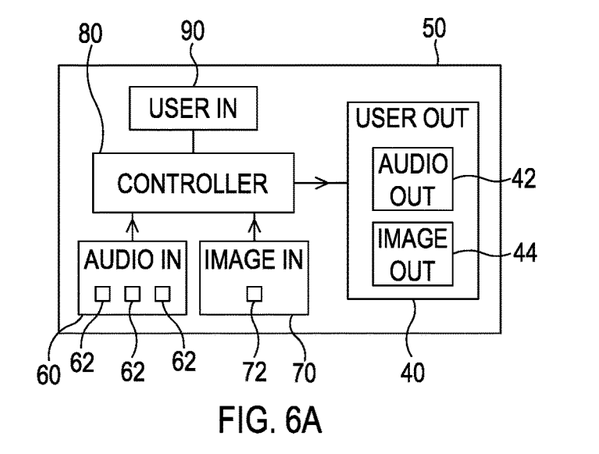
FIG. 6A shows another example embodiment of the subject matter described herein.

FIG. 6A illustrates an example of an apparatus 50.

The apparatus 50 is an audio capture apparatus and comprises audio input circuitry 60 for input of audio. The audio input circuitry comprises multiple audio capture devices 62, In this example, the multiple audio capture devices 62 are microphones.

The microphones are spatially distributed forming an array of discrete microphones. The array can, for example, be 1D, 2D or 3D.

The apparatus 50 is an image capture apparatus and comprises an image capture device 70.

The image capture device 70 can be a camera or image sensor.

It can, for example, be a video camera 72.

A controller 80 is configured to receive audio data from the audio input circuitry 60 and visual data from the image capture device 70. The data can be raw or some pre-processing can occur at the audio input circuitry 60 and/or the image capture device 70.

In this example the apparatus 50 is a beamformer apparatus. It is configured to spatially filter the audio data from the audio input circuitry 60 to provide audio focus as previously described. Audio focus attenuates sound from unwanted directions.

The controller 80 is also configured to:
identify audio-focus attenuation of a sound source 12;
determine a correspondence between the sound source 12 that is subject to audio focus attenuation and a corresponding visual object 22; and
modify capturing of an image to at least partially exclude and/or modify the visual object 22 corresponding to the sound source 12 that is subject to audio focus attenuation.

The apparatus 50 is a rendering apparatus and comprises user output circuitry 40 for rendering images and audio simultaneously as multi-media content. The user output circuitry 40 comprises, in this example, audio output circuitry 42 which can comprise one of more loudspeakers, headphones, or an interface to loudspeakers or headphones. The user output circuitry 40 comprises, in this example, image output circuitry which can comprise one of more displays 44, for example.

The apparatus 50 can be configured to display, on the display 44, an image before exclusion/modification of the visual object corresponding to the sound source that is subject to audio focus attenuation.

The apparatus 50 can be configured to display, on the display 44, the image after exclusion/modification of the visual object corresponding to the sound source that is subject to audio focus attenuation.

The apparatus 50 can be configured to display, on the display 44, the captured image that at least partially excludes and/or modifies the visual object corresponding to the sound source subject to audio focus attenuation.

The apparatus 50 can, in some examples, comprise user input circuitry 90 that is configured to enable a user to provide control commands to the apparatus 50. In some but not necessarily all examples, the user input circuitry 90 can be integrated with the display 44 to create a touch screen display. In some but not necessarily all examples, the display 44 or touchscreen display provides a camera viewfinder for the video camera 72. The user input circuitry 90 may enable a user to identify a sound source 12 and/or a visual object 22 associated with a sound source 12.

The apparatus 50 can be a portable or hand portable device. It can, for example, be a camera or can be a mobile telephone with a camera function.

Figure 6B:
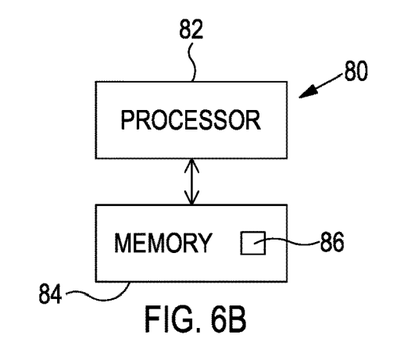
FIG. 6B shows another example embodiment of the subject matter described herein.
Figure 6C:
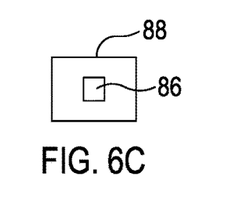
FIG. 6C shows another example embodiment of the subject matter described herein.

FIG. 6B illustrates an example of a controller 80. Implementation of a controller 80 may be as controller circuitry. The controller 80 may be implemented in hardware alone, have certain aspects in software including firmware alone or can be a combination of hardware and software (including firmware).

As illustrated in FIG. 6B the controller 80 may be implemented using instructions that enable hardware functionality, for example, by using executable instructions of a computer program 86 in a general-purpose or special-purpose processor 82 that may be stored on a computer readable storage medium (disk, memory etc) to be executed by such a processor 82.

The processor 82 is configured to read from and write to the memory 84. The processor 82 may also comprise an output interface via which data and/or commands are output by the processor 82 and an input interface via which data and/or commands are input to the processor 82.

The memory 84 stores a computer program 86 comprising computer program instructions (computer program code) that controls the operation of the apparatus 50 when loaded into the processor 82. The computer program instructions, of the computer program 86, provide the logic and routines that enables the apparatus to perform the methods illustrated in FIG. 3. The processor 82 by reading the memory 84 is able to load and execute the computer program 86.

The apparatus 50 therefore comprises:
at least one processor 82; and
at least one memory 84 including computer program code
the at least one memory 84 and the computer program code configured to, with the at least one processor 82, cause the apparatus 50 at least to perform:
identifying audio focus attenuation of a sound source;
determining a correspondence between the sound source that is subject to audio focus attenuation and a corresponding visual object; and
modifying capturing of an image to at least partially exclude and/or modify the visual object corresponding to the sound source subject to audio focus attenuation.

As illustrated in FIG. 6B, the computer program 86 may arrive at the apparatus 50 via any suitable delivery mechanism 88. The delivery mechanism 88 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 86. The delivery mechanism may be a signal configured to reliably transfer the computer program 86. The apparatus 50 may propagate or transmit the computer program 86 as a computer data signal.

Computer program instructions for causing an apparatus to perform at least the following or for performing at least the following:
identifying audio focus attenuation of a sound source;
determining a correspondence between the sound source that is subject to audio focus attenuation and a corresponding visual object; and
modifying capturing of an image to at least partially exclude and/or modify the visual object corresponding to the sound source subject to audio focus attenuation.

The computer program instructions may be comprised in a computer program, a non-transitory computer readable medium, a computer program product, a machine readable medium. In some but not necessarily all examples, the computer program instructions may be distributed over more than one computer program.

Although the memory 84 is illustrated as a single component/circuitry it may be implemented as one or more separate components/circuitry some or all of which may be integrated/removable and/or may provide permanent/semi-permanent/dynamic/cached storage.

Although the processor 82 is illustrated as a single component/circuitry it may be implemented as one or more separate components/circuitry some or all of which may be integrated/removable. The processor 82 may be a single core or multi-core processor.

The above described examples can be extended to situations where there are multiple audio focus directions.

The above described examples can be extended to situations where there are multiple sound sources that are subject to audio focus attenuation and correspond to visual objects in a candidate captured image.

The method 100 is performed for each of those sound sources.

The method can comprise:

at block 102, identifying audio-focus attenuation of multiple sound sources 12;

at block 104, determining a correspondence between a plurality of the sound sources 12 that are subject to audio focus attenuation and a respective plurality of visual objects 22 present in an image to be captured; and at block 106, modifying capturing of an image to at least partially exclude and/or modify at least some of the respective plurality of visual objects 22 corresponding to the plurality of sound sources 12 subject to audio focus attenuation.

In some but not necessarily all examples, the method wholly or partially excludes and/or modifies all visual objects 22 associated with sound sources 12 subject to audio focus attenuation that would otherwise have been within the captured image. As a result no sound sources 12 that have been attenuated are visible.

In some but not necessarily all examples, modifying capturing of an image is configured to exclude selected visual objects 22 associated with sound sources 12 subject to audio focus attenuation, wherein the selection of the visual objects 22 is dependent upon one or more of:

minimizing a number of visual objects 22 associated with sound sources 12 subject to audio focus attenuation, within the captured image;

maximizing a number of visual objects 22 associated with sound sources 12 subject to audio focus attenuation, excluded from the captured image;

minimizing a total energy of sound sources 12 subject to audio focus attenuation and associated with visual objects 22 within the captured image;

maximizing a total energy of sound sources 12 subject to audio focus attenuation and associated with visual objects 22 excluded from the captured image;

object recognition of visual objects 22 associated with sound sources 12 subject to audio focus attenuation;

proximity to the apparatus 50 of visual objects 22 associated with sound sources 12 subject to audio focus attenuation;

movement or change in visual objects 22 associated with sound sources subject to audio focus attenuation;

minimizing an area of the captured image occupied by visual objects 22 associated with sound sources 12 subject to audio focus attenuation.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIG. 3 may represent steps in a method and/or sections of code in the computer program 86. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

In some but not necessarily all examples, the apparatus 50 is configured to communicate data from the apparatus 50 with or without local storage of the data in a memory 84 at the apparatus 50 and with or without local processing of the data by circuitry or processors at the apparatus 50.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The apparatus 50 may be part of the Internet of Things forming part of a larger, distributed network.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 50 where it may produce an output sensible to the subject such as an audio output, visual output or haptic output.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to temporary recording of the data of the image. The use of the term 'store' in relation to an image relates to permanent recording of the data of the image.

In the above examples, the captured images can also be recorded images.

As used here 'module' refers to a unit or apparatus that excludes certain parts/components that would be added by an end manufacturer or a user.

For example, the apparatus 50 can be separated physically into one or more of: audio input circuitry 60, an image capture device 70, a controller 80 and user output circuitry 40 which can be separated in time and/or in space. The functionality of the apparatus 50 can be implemented using multiple different but functionally coupled devices.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
   at least one processor; and
   at least one non-transitory memory including computer program code,
   the at least one memory and the computer program code configured to, with the at least one processor, cause the apparatus to perform:
      determining that a sound source has an energy or level in excess of a first threshold;
      determining, between a targeted sound source and the sound source, a correlation below a second threshold;
      identifying audio-focus attenuation of the sound source in response to: the energy or level of the sound source being in excess of the first threshold, and the correlation between the targeted sound source and the sound source being below the second threshold;
      determining a correspondence between the sound source that is subject to audio-focus attenuation and a corresponding visual object; and
      modifying capturing of an image to at least partially exclude and/or modify the visual object corresponding to the sound source that is subject to audio focus attenuation.

2. An apparatus as claimed in claim 1 where the at least one memory and the computer program code are configured to, with the at least one processor, cause the apparatus to perform:
   determining a location of the sound source that is subject to audio focus attenuation;
   determining the visual object based, at least partially, on an association of the visual object with the location of the sound source that is subject to audio focus attenuation; and
   modifying the captured image to exclude the determined visual object.

3. An apparatus as claimed in claim 2, wherein the sound source is located at any one of a plurality of locations.

4. An apparatus as claimed in claim 2, wherein the sound source is located using spatial audio.

5. An apparatus as claimed in claim 1, wherein the targeted sound source is user-selected, the apparatus comprises a selector, in a viewfinder display, of a targeted visual object associated with the targeted sound source.

6. An apparatus as claimed in claim 2, wherein the at least one memory and the computer program code are configured to, with the at least one processor, cause the apparatus to perform object recognition.

7. An apparatus as claimed in claim 1, wherein the at least one memory and the computer program code are configured to, with the at least one processor, cause the apparatus to perform:
   reframing the captured image to exclude the visual object corresponding to the sound source.

8. An apparatus as claimed in claim 1, wherein the at least one memory and the computer program code are configured to, with the at least one processor, cause the apparatus to perform:
   changing a crop applied to an image detected at an image sensor array, wherein the applied crop determines the image captured.

9. An apparatus as claimed in claim 8, wherein the at least one memory and the computer program code are configured to, with the at least one processor, cause the apparatus to perform:
   changing a position of the crop applied to the image detected at the image sensor array.

10. An apparatus as claimed in claim 9, wherein the at least one memory and the computer program code are configured to, with the at least one processor, cause the apparatus to perform:
    maintaining a size of the crop applied to the image detected at the image sensor array.

11. An apparatus as claimed in claim 1, wherein the at least one memory and the computer program code are configured to, with the at least one processor, cause the apparatus to perform:
    excluding all visual objects associated with sound sources subject to audio focus attenuation.

12. An apparatus as claimed in claim 1, wherein the at least one memory and the computer program code are configured to, with the at least one processor, cause the apparatus to perform:
    excluding selected visual objects associated with sound sources subject to audio focus attenuation, wherein the selection of the visual objects is dependent upon one or more of:
       minimizing a number of visual objects associated with sound sources subject to audio focus attenuation that are within the captured image;
       maximizing a number of visual objects associated with sound sources subject to audio focus attenuation that are excluded from the captured image;
       minimizing a total energy of sound sources subject to audio focus attenuation and associated with visual objects within the captured image;
       maximizing a total energy of sound sources subject to audio focus attenuation and associated with visual objects excluded from the captured image;
       object recognition of visual objects associated with sound sources subject to audio focus attenuation;
       proximity to the apparatus of visual objects associated with the sound sources subject to audio focus attenuation; or
       minimizing an area of the captured image occupied with the visual objects associated with the sound sources subject to audio focus attenuation.

13. A computer program encoded on a non-transitory computer readable medium that, when run on a computer, is configured to perform:
    determining that a sound source has an energy or level in excess of a first threshold;
    determining, between a targeted sound source and the sound source, a correlation below a second threshold;
    identifying audio focus attenuation of the sound source in response to: the energy or level of the sound source being in excess of the first threshold, and the correlation between the targeted sound source and the sound source being below the second threshold;
    determining a correspondence between the sound source that is subject to audio focus attenuation and a corresponding visual object; and
    modifying capturing of an image to at least partially exclude and/or modify the visual object corresponding to the sound source subject to audio focus attenuation.

14. The computer program of claim 13 that, when run on the computer, is configured to perform:
    determining a location of the sound source that is subject to audio focus attenuation;

determining the visual object based, at least partially, on an association of the visual object with the location of the sound source that is subject to audio focus attenuation; and modifying the captured image to exclude the determined visual object.

15. A method comprising:

determining that a sound source has an energy or level in excess of a threshold;

determining, between a targeted sound source and the sound source, a correlation below a second threshold;

identifying audio focus attenuation of the sound source in response to: the energy or level of the sound source being in excess of the first threshold, and the correlation between the targeted sound source and the sound source being below the second threshold;

determining a correspondence between the sound source that is subject to audio focus attenuation and a corresponding visual object; and modifying capturing of an image to at least partially exclude and/or modify the visual object corresponding to the sound source subject to audio focus attenuation.

16. The method of claim 15, further comprising:

determining a location of the sound source that is subject to audio focus attenuation;

determining the visual object based, at least partially, on an association of the visual object with the location of the sound source that is subject to audio focus attenuation; and modifying the captured image to exclude the determined visual object.

17. The method of claim 15, further comprising:

changing a crop applied to an image detected at an image sensor array, wherein the applied crop determines the image captured.

18. The method of claim 17, further comprising:

changing a position of the crop applied to the image detected at the image sensor array.

19. The method of claim 18, further comprising:

maintaining a size of the crop applied to the image detected at the image sensor array.

20. The method of claim 15, further comprising:

excluding selected visual objects associated with sound sources subject to audio focus attenuation, wherein the selection of the visual objects is dependent upon one or more of:

minimizing a number of visual objects associated with sound sources subject to audio focus attenuation that are within the captured image;

maximizing a number of visual objects associated with sound sources subject to audio focus attenuation that are excluded from the captured image;

minimizing a total energy of sound sources subject to audio focus attenuation and associated with visual objects within the captured image;

maximizing a total energy of sound sources subject to audio focus attenuation and associated with visual objects excluded from the captured image;

object recognition of visual objects associated with sound sources subject to audio focus attenuation;

proximity to the apparatus of visual objects associated with the sound sources subject to audio focus attenuation; or minimizing an area of the captured image occupied with the visual objects associated with the sound sources subject to audio focus attenuation.

* * * * *